(12) United States Patent
Wang et al.

(10) Patent No.: US 12,495,792 B2
(45) Date of Patent: Dec. 16, 2025

(54) CELL SHEET PROTECTION SOLUTION

(71) Applicant: BOE TECHNOLOGY GROUP CO., LTD., Beijing (CN)

(72) Inventors: Juan Wang, Beijing (CN); Yufei Zhao, Beijing (CN); Shuang Gao, Beijing (CN); Xin Jin, Beijing (CN); Yuqin Tan, Beijing (CN); Zhisheng Li, Beijing (CN); Dehua Chang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 1319 days.

(21) Appl. No.: 17/256,765

(22) PCT Filed: May 15, 2020

(86) PCT No.: PCT/CN2020/090383
§ 371 (c)(1),
(2) Date: Dec. 29, 2020

(87) PCT Pub. No.: WO2020/259120
PCT Pub. Date: Dec. 30, 2020

(65) Prior Publication Data
US 2021/0259239 A1 Aug. 26, 2021

(30) Foreign Application Priority Data
Jun. 24, 2019 (CN) .......................... 201910550572.X (51) Int. Cl.
*A01N 1/126* (2025.01)
*A61L 27/38* (2006.01)
*C12N 5/0775* (2010.01)

(52) U.S. Cl.
CPC .......... *A01N 1/126* (2025.01); *A61L 27/3834* (2013.01); *C12N 5/0662* (2013.01); *C12N 2533/52* (2013.01); *C12N 2539/10* (2013.01)

(58) Field of Classification Search
None
See application file for complete search history.

(56) References Cited

U.S. PATENT DOCUMENTS

2005/0101011 A1 5/2005 Tsao
2018/0312805 A1* 11/2018 Reubinoff ............ C12N 5/0621

FOREIGN PATENT DOCUMENTS

| CN | 101984048 A | 3/2011 | |
| CN | 102827807 A | 12/2012 | |
| CN | 105647860 A | 6/2016 | |
| CN | 105779381 A | 7/2016 | |
| CN | 105820998 A | 8/2016 | |
| CN | 107043738 A | 8/2017 | |
| CN | 107385517 A | 11/2017 | |
| CN | 108220220 A | 6/2018 | |
| WO | WO-2017156762 A1 * | 9/2017 | ........... C12N 5/0031 |

OTHER PUBLICATIONS

Arora, "Cell Culture Media: A Review", (2013) Mater Methods, vol. 3: 175 (Year: 2013).*
Search Report issued for EP Application No. 20824417.8, mailed on Feb. 3, 2023, 8 pages.
Guo, L. and Chen, M., "Animal cell separation and culture", Aug. 31, 2015, 3 pages.
Wang, Y. and Yang, S., "Techniques for Animal Cell Culture", Jul. 31, 2012, 4 pages.

* cited by examiner

*Primary Examiner* — Teresa E Knight
(74) *Attorney, Agent, or Firm* — Raj S. Dave; Dave Law Group LLC (57) ABSTRACT

The present disclosure relates to a cell sheet protection solution, such as a stem cell sheet protection solution, such as a mesenchymal stem cell sheet protection solution. The present disclosure also relates to use of the cell sheet protection solution in storage and transportation of the cell sheet.

8 Claims, 6 Drawing Sheets

CELL SHEET PROTECTION SOLUTION

CROSS-REFERENCE TO RELATED APPLICATIONS

The present application is the U.S. National Stage Entry of PCT/CN2020/090383, filed on May 15, 2020, which claims priority of Chinese Patent Application No. 201910550572X, filed on Jun. 24, 2019, the entire disclosures of which are incorporated herein by reference as part of the disclosure of this application.

TECHNICAL FIELD

The present disclosure relates to the fields of tissue engineering and regenerative medicine, and in particular to cell sheet protection solution and its use in storage and transportation of cell sheets.

BACKGROUND ART

At present, the incidence of tissue and organ damages caused by degenerative diseases or trauma (such as heart failure, Parkinson's disease, senile dementia and other diseases) is increasing year by year, and traditional medical methods are difficult to completely cure these diseases. Stem cells include pluripotent stem cells and adult stem cells that have the potential to differentiate into a variety of functional cells and can also secrete a variety of cytokines that are beneficial to the repair of tissues and organs. They are ideal cells for repairing damaged tissues and organs.

At present, there have been a large number of basic and clinical researches on stem cells repairing damaged tissues and organs to treat diseases in the world. In these researches, the method of direct injection of cells or the method of transplantation of cells combined with biological materials are mostly employed, both of which have certain limitations. Direct injection of cells will result in the loss of a large number of stem cells, which will not only affect the effect of stem cell therapy, but also bring side effects such as pulmonary embolism. The co-transplantation of cells and biomaterials solves the problem of cell loss. However, the degradation of biomaterials in the body will trigger inflammation at various degrees, and the degradation process and degradation products of the stent may cause local tissue lesions.

The cell sheet technology provides a new technology for stem cell transplantation and application. In the process of culturing, stem cells will establish connections between cells and between cells and petri dishes through the extracellular matrix. The cells and extracellular matrix can be separated from the bottom of the thermo-sensitive smart petri dishes without enzymatic digestion by changing the contact between the cells and the petri dishes through changing the temperature and adjusting the thermo-sensitive smart petri dishes, and an intact cell sheet is obtained. The cell sheet obtained by this method has a high cell density, a uniform thickness and a complete structure. Since the cell sheet prepared by this method does not lose any extracellular matrix, the extracellular matrix components such as adhesin therein can make the cell sheet adhere to the surface of the target tissue or organ without relying on additional sutures, adhesives, etc.

Cell sheets need to undergo storage and transportation processes from being manufactured in the laboratory to being applicated on patients in the hospital. During this process, if the cell sheet preservation solution is not suitable, the viability and secreted factors of the cells in the cell sheet cannot be guaranteed, and the integrity of the cell sheet and the connection between the cells in the sheet will be destroyed, which will seriously affect the clinical application of cell sheets.

Therefore, it is necessary to develop a cell sheet transport protection solution to ensure that the cell viability and the amount of secreted factors of the cell sheet will not be affected; neither will the integrity of the cell sheet or the cell connections within the sheet during the storage and transportation.

SUMMARY OF THE INVENTION

The present disclosure provides a cell sheet protection solution, which is capable of maintaining the viability and ability to secret cytokines of the cells within the cell sheet and maintaining the integrity of the cell sheet and the cell connections within the sheet to protect cells from apoptosis during the storage and transportation of the cell sheet.

Accordingly, in one aspect, the present disclosure relates to a cell sheet protection solution comprising the following components:

a. a buffered salt solution;
b. an extracellular matrix component;
c. a reducing agent;
d. a substance required for cell metabolism; and
e. a hormone.

In some embodiments, non-limiting examples of the buffered salt solution include phosphate buffered saline (PBS), Hanks buffer, HEPES buffer, Dulbecco's phosphate buffered saline (DPBS) and MOPS buffer. Other buffered salt solutions known in the art can also be used, especially buffered salt solutions used in cell and tissue related experiments.

Non-limiting examples of the extracellular matrix component include collagen, gelatin, fibronectin, laminin, and vitronectin. In some embodiments of the cell sheet protection solution of the present disclosure, the extracellular matrix component includes one or more extracellular matrix components selected from collagen, gelatin, fibronectin, laminin, and vitronectin, such as at least 1, at least 2, at least 3, at least 4, or all 5 extracellular matrix components selected from collagen, gelatin, fibronectin, laminin, and vitronectin.

Non-limiting examples of the reducing agent include vitamin C, sodium selenate, sodium pyruvate and glutathione. In some embodiments of the cell sheet protection solution of the present disclosure, the reducing agent includes one or more extracellular matrix components selected from vitamin C, sodium selenate, sodium pyruvate and glutathione, such as at least 1, at least 2, at least 3, or all 4 reducing agents selected from vitamin C, sodium selenate, sodium pyruvate and glutathione.

Non-limiting examples of the substance required for cell metabolism include transferrin, human serum albumin, putrescine, ethanolamine, carnitine, linoleic acid and linolenic acid. In some embodiments of the cell sheet protection solution of the present disclosure, the substance required for cell metabolism includes one or more substances selected from transferrin, human serum albumin, putrescine, ethanolamine, carnitine, linoleic acid, linolenic acid and amino acid, such as at least 1, at least 2, at least 3, at least 4, at least 5, at least 6, at least 7, or all 8 substances required for cell metabolism selected from transferrin, human serum albumin, putrescine, ethanolamine, carnitine, linoleic acid, linolenic acid and amino acid.

In some embodiments, the amino acid may be selected from one or more of alanine, aspartic acid, asparagine, glutamic acid, alanylglutamine, glycine, proline, serine, taurine, cysteine, arginine, cystine, histidine, isoleucine, leucine, lysine, methionine, phenylalanine, threonine, tryptophan, tyrosine and valine.

Non-limiting examples of the hormone include hydrocortisone, insulin and progesterone. In some embodiments of the cell sheet protection solution of the present disclosure, the hormone includes one or more hormones selected from hydrocortisone, insulin and progesterone, such as at least 1, at least 2, or all 3 hormones selected from hydrocortisone, insulin and progesterone.

In some embodiments, the cell sheet protection solution of the present disclosure includes the following components:
 a. a buffered salt solution: PBS, Hanks buffer or HEPES buffer;
 b. an extracellular matrix component: gelatin, fibronectin, vitronectin, or any combination thereof;
 c. a reducing agent: vitamin C, glutathione, sodium selenate, sodium pyruvate, or any combination thereof,
 d. a substance required for cell metabolism: transferrin, linoleic acid, linolenic acid, putrescine, human serum albumin, carnitine, ethanolamine, or any combination thereof, and
 e. a hormone: insulin, progesterone, or combinations thereof.

In some embodiments, the cell sheet protection solution of the present disclosure includes the following components:
 a. a buffered salt solution: PBS;
 b. an extracellular matrix component: gelatin;
 c. a reducing agent: vitamin C and glutathione;
 d. a substance required for cell metabolism: transferrin, linoleic acid and linolenic acid; and
 e. a hormone: insulin.

In some embodiments, the cell sheet protection solution of the present disclosure includes the following components:
 a. a buffered salt solution: Hanks buffer;
 b. an extracellular matrix component: fibronectin;
 c. a reducing agent: vitamin C and sodium selenate;
 d. a substance required for cell metabolism: transferrin, putrescine, human serum albumin and carnitine; and
 e. a hormone: insulin and progesterone.

In some embodiments, the cell sheet protection solution of the present disclosure includes the following components:
 a. a buffered salt solution: HEPES buffer;
 b. an extracellular matrix component: vitronectin;
 c. a reducing agent: sodium pyruvate, glutathione and sodium selenate;
 d. a substance required for cell metabolism: linoleic acid, linolenic acid and ethanolamine; and
 e. a hormone: insulin and progesterone.

In some embodiments, the cell sheet protection solution of the present disclosure includes the following components:
 a. a buffered salt solution: HEPES buffer;
 b. an extracellular matrix component: vitronectin;
 c. a reducing agent: sodium pyruvate, glutathione and sodium selenate;
 d. a substance required for cell metabolism: alanine, aspartic acid, asparagine, glutamic acid, alanylglutamine, glycine, proline, serine and taurine; and
 e. a hormone: insulin and progesterone.

In some embodiments, the cell sheet protection solution of the present disclosure includes the following components:
 a. a buffered salt solution: MOPS buffer;
 b. an extracellular matrix component: fibronectin;
 c. a reducing agent: glutathione and vitamin C;
 d. a substance required for cell metabolism: alanine, aspartic acid, asparagine, glutamic acid, alanylglutamine, glycine, proline, serine and taurine; and
 e. a hormone: insulin.

In any embodiment of the cell sheet protection solution of the present disclosure, collagen as an extracellular matrix component may be at a concentration of 0.1-10 mg/L, such as 0.5-5 mg/L, such as 0.5-2 mg/L, such as about 1 mg/L.

In any embodiment of the cell sheet protection solution of the present disclosure, gelatin as an extracellular matrix component may be at a concentration of 0.1-10 mg/L, such as 0.5-5 mg/L, such as 0.5-2 mg/L, such as about 1 mg/L.

In any embodiment of the cell sheet protection solution of the present disclosure, fibronectin as an extracellular matrix component may be at a concentration of 1-50 mg/L, such as 5-30 mg/L, such as 5-20 mg/L, such as about 10 mg/L.

In any embodiment of the cell sheet protection solution of the present disclosure, laminin as an extracellular matrix component may be at a concentration of 1-50 mg/L, such as 2-20 mg/L, such as 2-10 mg/L, such as about 5 mg/L.

In any embodiment of the cell sheet protection solution of the present disclosure, vitronectin as an extracellular matrix component may be at a concentration of 1-50 mg/L, such as 5-30 mg/L, such as 5-20 mg/L, such as about 10 mg/L.

In any embodiment of the cell sheet protection solution of the present disclosure, vitamin C as a reducing agent may be at a concentration of 50-2000 mg/L, such as 100-1000 mg/L, such as 200-1000 mg/L, such as about 500 mg/L.

In any embodiment of the cell sheet protection solution of the present disclosure, sodium selenate as a reducing agent may be at a concentration of 0.001-0.1 mg/L, such as 0.005-0.05 mg/L, such as 0.01-0.05 mg/L, such as about 0.02 mg/L.

In any embodiment of the cell sheet protection solution of the present disclosure, sodium pyruvate as a reducing agent may be at a concentration of 5-200 mg/L, such as 10-100 mg/L, such as 10-50 mg/L, such as about 25 mg/L.

In any embodiment of the cell sheet protection solution of the present disclosure, glutathione as a reducing agent may be at a concentration of 1-50 mg/L, such as 5-30 mg/L, such as 5-20 mg/L, such as about 10 mg/L.

In any embodiment of the cell sheet protection solution of the present disclosure, transferrin as a substance required for cell metabolism may be at a concentration of 1-50 mg/L, such as 5-30 mg/L, such as 5-20 mg/L, such as about 10 mg/L.

In any embodiment of the cell sheet protection solution of the present disclosure, human serum albumin as a substance required for cell metabolism may be at a concentration of 500-5000 mg/L, such as 1000-5000 mg/L, such as about 2000 mg/L.

In any embodiment of the cell sheet protection solution of the present disclosure, putrescine as a substance required for cell metabolism may be at a concentration of 1-50 mg/L, such as 5-30 mg/L, such as 5-20 mg/L, such as about 10 mg/L.

In any embodiment of the cell sheet protection solution of the present disclosure, ethanolamine as a substance required for cell metabolism may be at a concentration of 0.1-10 mg/L, such as 0.5-5 mg/L, such as 0.5-2 mg/L, such as about 1 mg/L.

In any embodiment of the cell sheet protection solution of the present disclosure, carnitine as a substance required for cell metabolism may be at a concentration of 0.1-10 mg/L, such as 0.5-5 mg/L, such as 0.5-2 mg/L, such as about 1 mg/L.

In any embodiment of the cell sheet protection solution of the present disclosure, linoleic acid as a substance required for cell metabolism may be at a concentration of 0.1-10 mg/L, such as 0.5-5 mg/L, such as 0.5-2 mg/L, such as about 1 mg/L.

In any embodiment of the cell sheet protection solution of the present disclosure, linolenic acid as a substance required for cell metabolism may be at a concentration of 0.1-10 mg/L, such as 0.5-5 mg/L, such as 0.5-2 mg/L, such as about 1 mg/L.

In any embodiment of the cell sheet protection solution of the present disclosure, as a substance required for cell metabolism, alanine may be at a concentration of 0.025-0.4 mM, such as 0.05-0.2 mM, such as about 0.1 mM; aspartic acid may be at a concentration of 0.025-0.4 mM, such as 0.05-0.2 mM, such as about 0.1 mM; asparagine may be at a concentration of 0.025-0.4 mM, such as 0.05-0.2 mM, such as about 0.1 mM; glutamic acid may be at a concentration of 0.025-0.4 mM, such as 0.05-0.2 mM, such as about 0.1 mM; alanylglutamine may be at a concentration of 0.1-2 mM, such as 0.2-1 mM, such as about 0.5 mM; glycine may be at a concentration of 0.025-0.4 mM, such as 0.05-0.2 mM, such as about 0.1 mM; proline may be at a concentration of 0.025-0.4 mM, such as 0.05-0.2 mM, such as about 0.1 mM; serine may be at a concentration of 0.025-0.4 mM, such as 0.05-0.2 mM, such as about 0.1 mM; taurine may be at a concentration of 0.025-0.4 mM, such as 0.05-0.2 mM, such as about 0.1 mM; cysteine may be at a concentration of 0.1-2 mM, such as 0.2-1 mM, such as about 0.5 mM; arginine may be at a concentration of 0.15-2.4 mM, such as 0.3-1.2 mM, such as about 0.6 mM; cystine may be at a concentration of 0.025-0.4 mM, such as 0.05-0.2 mM, such as about 0.1 mM; histidine may be at a concentration of 0.05-0.8 mM, such as 0.1-0.4 mM, such as about 0.2 mM; isoleucine may be at a concentration of 0.1-1.6 mM, such as 0.2-0.8 mM, such as about 0.4 mM; leucine may be at a concentration of 0.1-1.6 mM, such as 0.2-0.8 mM, such as about 0.4 mM; lysine may be at a concentration of 0.1-1.6 mM, such as 0.2-0.8 mM, such as about 0.4 mM; methionine may be at a concentration of 0.025-0.4 mM, such as 0.05-0.2 mM, such as about 0.1 mM; phenylalanine may be at a concentration of 0.05-0.8 mM, such as 0.1-0.4 mM, such as about 0.2 mM; threonine may be at a concentration of 0.1-1.6 mM, such as 0.2-0.8 mM, such as about 0.4 mM; tryptophan may be at a concentration of 0.1-2 mM, such as 0.2-1 mM, such as about 0.5 mM; tyrosine may be at a concentration of 0.05-0.8 mM, such as 0.1-0.4 mM, such as about 0.2 mM; valine may be at a concentration of 0.1-1.6 mM, such as 0.2-0.8 mM, such as about 0.4 mM.

In any embodiment of the cell sheet protection solution of the present disclosure, hydrocortisone as a hormone may be at a concentration of 1-50 mg/L, such as 5-30 mg/L, such as 5-20 mg/L, such as about 10 mg/L.

In any embodiment of the cell sheet protection solution of the present disclosure, insulin as a hormone may be at a concentration of 1-50 mg/L, such as 5-30 mg/L, such as 5-20 mg/L, such as about 10 mg/L.

In any embodiment of the cell sheet protection solution of the present disclosure, progesterone as a hormone may be at a concentration of 0.001-0.1 mg/L, such as 0.005-0.05 mg/L, such as 0.005-0.02 mg/L, such as about 0.01 mg/L.

As used herein, the term "about" means+/−20% or less from the specified value, preferably +/−10% or less, and more preferably +/−5% or less, including the specified value, provided that such variations are suitable for use in the disclosed invention. It should be understood that the value referred to by the modifier "about" itself is also specifically and preferably disclosed.

In some embodiments, the cell sheet protection solution has a pH value close to neutral or physiological environment. For example, in some embodiments, the pH of the cell sheet protection solution is 6.0-8.0. In a preferred embodiment, the pH of the cell sheet protection solution is 7.0-7.4.

In some embodiments, the cell sheet protection solution is isotonic or near isotonic with the cell. For example, in some embodiments, the osmotic pressure of the cell sheet protection solution is 240-340 mOSM/L. In a preferred embodiment, the osmotic pressure of the cell sheet protection solution is about 280 mOSM/L.

In some embodiments, the cell sheet protection solution may further comprise serum, for example, the serum may be selected from fetal bovine serum, newborn bovine serum, calf serum and human serum. In some embodiments, the content of serum in the cell sheet protection solution is 1-20%, e.g. 5-10%.

In other embodiments, the cell sheet protection solution is free of serum.

A cell sheet protection solution that does not contain serum offers additional advantages. This is because when a cell sheet is applied to subjects such as patients, allogeneic or even xenogeneic serum has potential immune risks and is potential carriers of pathogenic microorganisms, etc. Although the use of autologous serum avoids the immune risk, its source is limited and the quality between batches is difficult to control, which is not conducive to the stability of cell sheet protection solution system.

In some embodiments, the cell sheet protection solution is a stem cell sheet protection solution.

In some embodiments, the cell sheet protection solution is a mesenchymal stem cell sheet protection solution. The mesenchymal stem cells may have different sources, such as from tissues selected from the following: amniotic fluid, amniotic membrane, chorion, chorionic villi, decidua, placenta, umbilical cord blood, Wharton's jelly, umbilical cord, adult bone marrow, adult peripheral blood, and adult adipose tissue.

In some embodiments, the mesenchymal stem cells are selected from umbilical cord mesenchymal stem cells, placental mesenchymal stem cells, adipose mesenchymal stem cells and bone marrow mesenchymal stem cells.

In some embodiments, the cell sheet protection solution is used for storage of a cell sheet. In other embodiments, the cell sheet protection solution is used for transportation of a cell sheet.

In one aspect, the present disclosure relates to the use of the cell sheet protection solution of the present disclosure in storage of a cell sheet.

In another aspect, the present disclosure relates to the use of the cell sheet protection solution of the present disclosure in transportation of a cell sheet.

In some embodiments of the above uses, the cell sheet is a stem cell sheet, such as a mesenchymal stem cell sheet.

In one aspect, the present disclosure relates to a method of storing a cell sheet, the method comprising:
 a. maintaining the cell sheet in the cell sheet protection solution of the present disclosure; and
 b. storing the cell sheet.

In some embodiments, the cell sheet is stored at a temperature of 0-37° C., such as about 4° C. or room temperature (about 25° C.).

In some embodiments, the cell sheet can be stored for a period of 12 hours to two weeks, such as about 24 hours, about 48 hours, about 72 hours, about 48 hours, about 5 days, about 6 days, about one week or about two weeks.

In another aspect, the present disclosure relates to a method of storing a cell sheet, the method comprising:
a. maintaining the cell sheet in the cell sheet protection solution of the present disclosure; and
b. transporting the cell sheet.

In some embodiments, the cell sheet is transported at a temperature of 0-37° C., such as about 4° C. or room temperature (about 25° C.).

In some embodiments, the cell sheet can be transported over a period of 12 hours to two weeks, such as about 24 hours, about 48 hours, about 72 hours, about 48 hours, about 5 days, about 6 days, about one week or about two weeks.

SPECIFIC EMBODIMENTS

Example 1. Preparation of a Mesenchymal Stem Cell Sheet

Before preparing the umbilical cord mesenchymal stem cell sheet, the surface of the thermo-sensitive petri dish was first coated with a matrix that facilitates the adherence of mesenchymal stem cells. The matrix used was fibronectin at a concentration of 10 mg/L. The thermo-sensitive petri dish was coated for 8 hours. Subsequently, the coating solution was discarded, and the single-cell suspension of mesenchymal stem cells was added to the smart petri dish. After the cells were adhered and proliferated for 12 hours, the temperature was decreased to 25° C. The cells were detached from the bottom of the thermo-sensitive smart petri dish in a sheet form, and become a cell sheet with complete connection of extracellular matrixes. The sheet is off-white, of dense structure, and of a smooth and flat surface.

Example 2. Preparation of Cell Sheet Protection Solutions

Exemplary cell sheet protection solutions with the following Formulation A, Formulation B, and Formulation C were prepared for further experiments.

Formulation A:
Buffered salt solution: PBS
Extracellular matrix components: gelatin (1 mg/L)
Reducing agents: vitamin C (500 mg/L); glutathione (10 mg/L)
Substances required for cell metabolism: transferrin (10 mg/L); linoleic acid (1.0 mg/L); linolenic acid (1.0 mg/L)
Hormones: insulin (10 mg/L)

Formulation B:
Buffered salt solution: Hanks buffer
Extracellular matrix components: fibronectin (10 mg/L)
Reducing agents: vitamin C (500 mg/L); sodium selenate (0.02 mg/L)
Substances required for cell metabolism: transferrin (10 mg/L); putrescine (10 mg/L); human serum albumin (2000 mg/L); carnitine (2 mg/L)
Hormones: insulin (10 mg/L); progesterone (0.01 mg/L)

Formulation C:
Buffered salt solution: HEPES buffer
Extracellular matrix components: vitronectin (10 mg/L)
Reducing agents: sodium pyruvate (25 mg/L); glutathione (10 mg/L); sodium selenate (0.02 mg/L)
Substances required for cell metabolism: linoleic acid (1 mg/L); linolenic acid (1 mg/L); ethanolamine (1 mg/L)
Hormones: insulin (10 mg/L); progesterone (0.01 mg/L).

Formulation D:
Buffered salt solution: HEPES buffer
Extracellular matrix components: vitronectin (10 mg/L)
Reducing agents: sodium pyruvate (25 mg/L); glutathione (10 mg/L); sodium selenate (0.02 mg/L)
Substances required for cell metabolism: alanine (0.1 mM); aspartic acid (0.1 mM); asparagine (0.1 mM); glutamic acid (0.1 mM); alanylglutamine (0.5 mM); glycine (0.1 mM); proline (0.1 mM); serine (0.1 mM); taurine (0.1 mM)
Hormones: insulin (10 mg/L); progesterone (0.01 mg/L).

Formulation E:
Buffered salt solution: MOPS buffer
Extracellular matrix components: fibronectin (10 mg/L)
Reducing agents: glutathione (10 mg/L); vitamin C (500 mg/L)
Substances required for cell metabolism: alanine (0.1 mM); aspartic acid (0.1 mM); asparagine (0.1 mM); glutamic acid (0.1 mM); alanylglutamine (0.5 mM); glycine (0.1 mM); proline (0.1 mM); serine (0.1 mM); taurine (0.1 mM)
Hormones: insulin (10 mg/L).

Example 3. Test of Cell Secreted Factors Before and After Transportation

Figure 1:
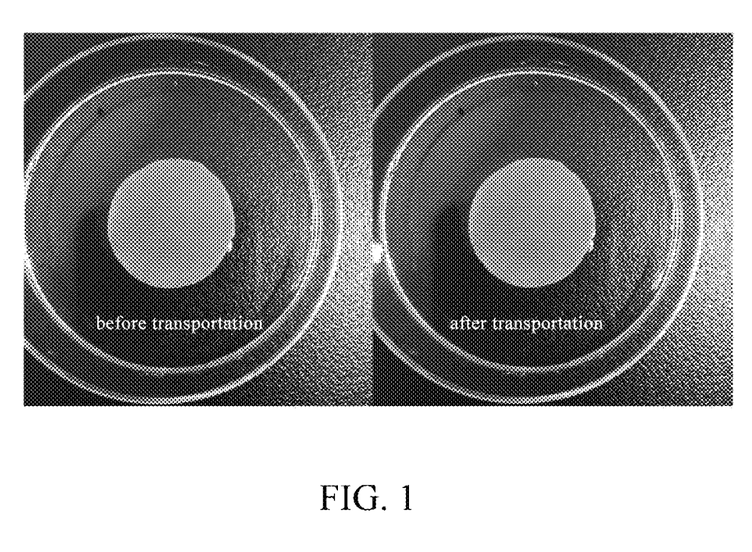
FIG. 1 shows exemplary photos of mesenchymal stem cell sheets before and after transportation in the cell sheet protection solution of the present disclosure (Formulation B).

The mesenchymal stem cell sheets prepared as described in Example 1 were placed in the cell sheet protection solution with Formulation A, Formulation B, Formulation C, Formulation D or Formulation E, respectively, and transported at 4° C. for 48 hours. Exemplary photos of the cell sheet before and after transportation in the cell sheet protection solution of Formulation B are shown in FIG. 1. It can be seen from the photos that the integrity of cell sheets were maintained before and after transportation, with no significant change in their morphology, and with features of smooth edges, flat surfaces, and no looseness or folds.

The therapeutic effects of mesenchymal stem cells on self-tissue repair and immune-related diseases are mainly achieved through the secretion and expression of immunosuppressive factors, cytokines, growth factors and the like to regulate inflammation and tissue homeostasis. In this example, the levels of secreted cytokines HGF (R&D, cat. No. DHG00B), IL-6 (R&D, cat. No. VAL102) and VEGF (Life Technologies, cat. No. KHG0112) in the supernatant of mesenchymal stem cell sheets were tested before and after transportation using enzyme-linked immunosorbent assay (ELISA) kits according to the manufacturer's instructions. Specifically, the cell sheet was placed in a fresh medium. After 16 hours, the supernatant was collected and placed in a 15 mL centrifuge tube, centrifuged at 400 g for 5 minutes to remove dead cells. The supernatant was taken directly for ELISA assay or frozen at −80° C. for subsequent ELISA assay.

Figure 2:
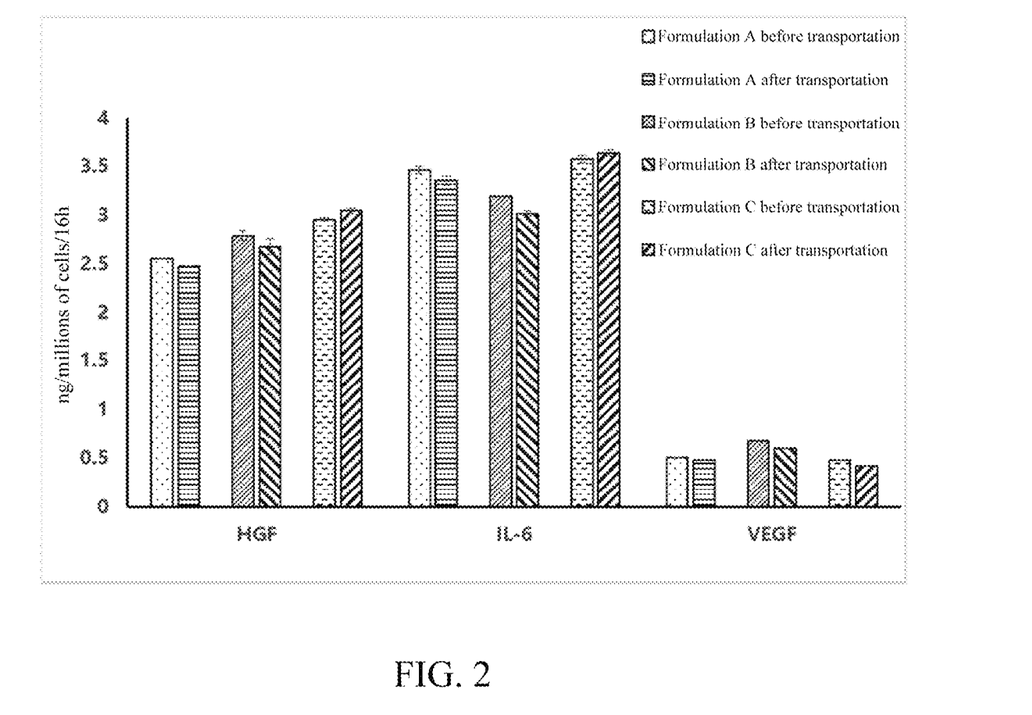
FIG. 2 shows a histogram of the levels of cytokines HGF, IL-6 and VEGF secreted by mesenchymal stem cell sheets before and after transportation in the cell sheet protection solution of the present disclosure (Formulation A, Formulation B, and Formulation C).
Figure 3:
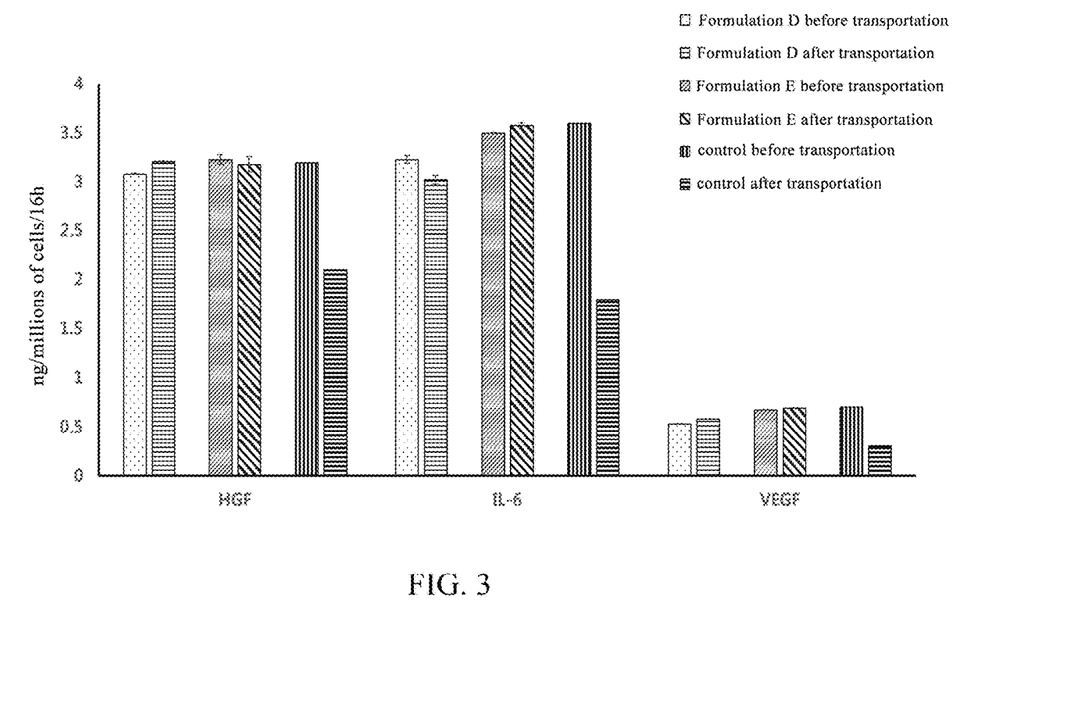
FIG. 3 shows a histogram of the levels of cytokines HGF, IL-6, and VEGF secreted by mesenchymal stem cell sheets before and after transportation in the cell sheet protection solution of the present disclosure (Formulation D and Formulation E) and the control buffer.

The results are shown in FIG. 2 and FIG. 3. From these results, it can be seen that the levels of cytokines secreted by mesenchymal stem cells did not change significantly before and after transportation in the cell sheet protection solution of the present disclosure, indicating that the viability of mesenchymal stem cells was maintained. On the contrary, the mesenchymal stem cell sheets transported in the control PBS buffer has a significantly reduced ability to secrete the cytokines HGF, IL-6 and VEGF.

Example 4. Test of Adhesion Proteins in Cell Sheets

The mesenchymal stem cell sheets obtained above were fixed with paraformaldehyde or formalin fixative, and the cell sheets were then made into tissue sections with a thickness of 4-10 μm by paraffin section or frozen section method for staining to observe the profile of proteins contained in the extracellular matrix in the cell sheets, while the DAPI dye was used to stain the nuclei to assist in positioning.

Figure 4:
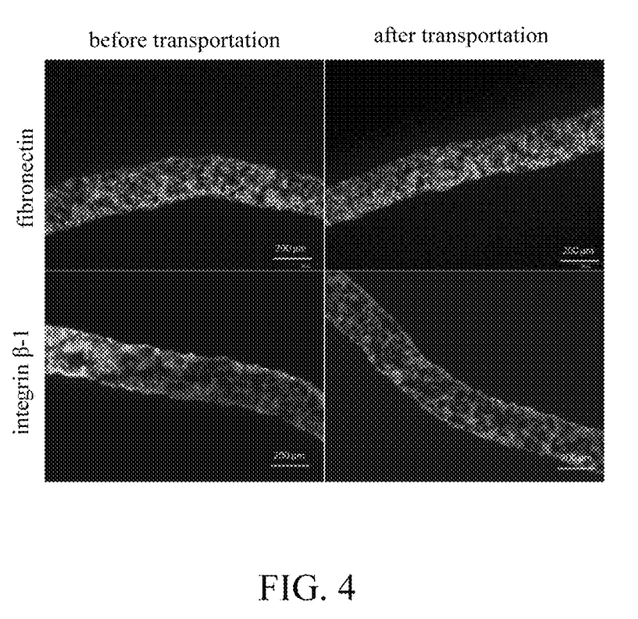
FIG. 4 shows the graphs of results of fluorescent staining of fibronectin and integrin-β1 in the mesenchymal stem cell sheets before and after transportation in the cell sheet protection solution of the present disclosure (Formulation B).

FIG. 4 shows the results of staining mesenchymal stem cell sheets with fluorescein-labelled anti-fibronectin and integrin-β1 antibodies before and after transportation in the cell sheet protection solution of Formulation B. These results indicate that the mesenchymal stem cell sheets contain a large amount of fibronectin and integrin-β31, which serve as the extracellular matrix in the sheets to connect mesenchymal stem cells. In addition, the amounts of adhesion proteins, fibronectin and integrin-β1 in the cell sheets before and after transportation did not change significantly, indicating that the intercellular connections in the cell sheets transported in the cell sheet protection solution of the present disclosure were maintained well.

Example 5. Test of Apoptosis in Cell Sheets

In addition, the apoptosis of mesenchymal stem cells in the cell sheets before and after transportation was tested. The specific testing steps were performed using Annexin V-FITC Apoptosis Detection Kit (Life Technologies, cat. No. BMS500FI) according to the manufacturer's instructions.

Figure 5:
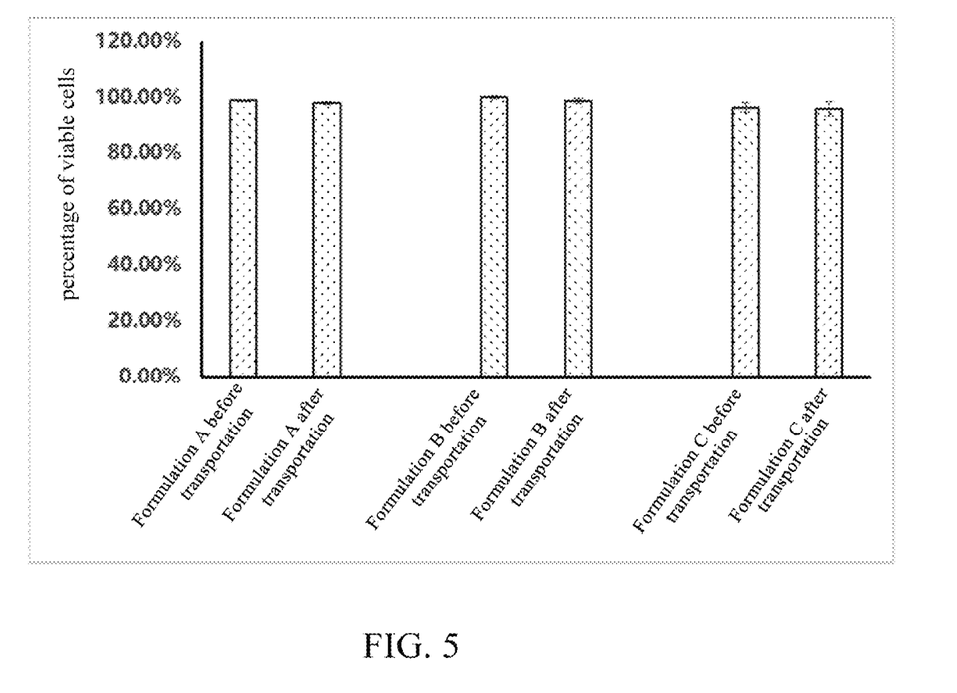
FIG. 5 shows a histogram of the results of the apoptosis level (percentage of living cells) in the mesenchymal stem cell sheets before and after transportation in the cell sheet protection solution of the present disclosure (Formulation A, Formulation B, and Formulation C).
Figure 6:
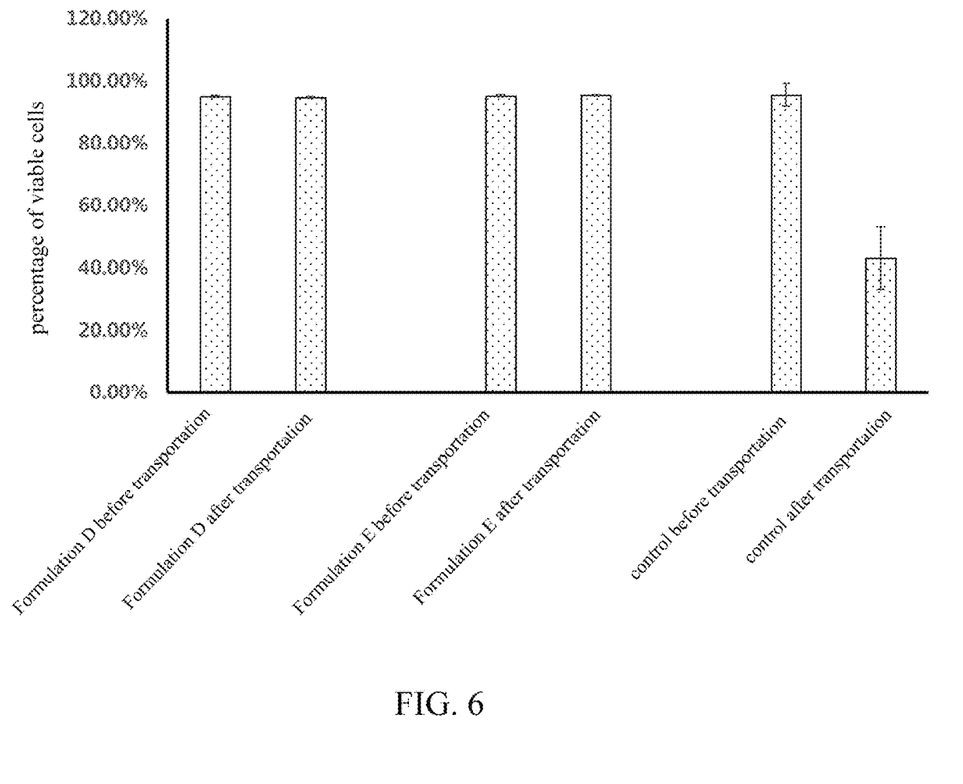
FIG. 6 shows a histogram of the results of the apoptosis level (percentage of viable cells) in the mesenchymal stem cell sheets before and after transportation in the cell sheet protection solution of the present disclosure (Formulation D and Formulation E) and the control buffer.

The results are shown in FIG. 5 and FIG. 6. These results show that the survival rate of the mesenchymal stem cells in the cell sheet did not change significantly before and after transportation in the cell sheet protection solution with Formulation A, Formulation B, Formulation C, Formulation D or Formulation E. In contrast, the percentage of viable cells in the cell sheet transported in the control PBS buffer decreased significantly. The above results indicate that the cell sheet protection solution of the present disclosure protects mesenchymal stem cells from apoptosis.

The specific embodiments of the present invention are described in detail above, but they are only examples, and the present invention is not limited to the specific embodiments described above. For those skilled in the art, any equivalent modifications and substitutions made to the present invention are also within the scope of the present invention. Therefore, all equivalent changes and modifications made without departing from the spirit and scope of the present invention should all fall within the scope of the present invention.

What is claimed is:

1. A cell sheet protection solution comprising the following components:
   a. a buffered salt solution;
   b. an extracellular matrix component;
   c. a reducing agent;
   d. a substance required for cell metabolism; and
   e. a hormone
   wherein the buffered salt solution is phosphate buffered saline (PBS), the extracellular matrix component includes gelatin, the concentration of gelatin being 0.5-5 mg/L: the reducing agent includes vitamin C and glutathione, the concentration of vitamin C being 100-1000 mg/L and the concentration of glutathione being 5-30 mg/L: the substance required for cell metabolism includes transferrin, linoleic acid and linolenic acid, the concentration of transferrin being 5-30 mg/L, the concentration of linoleic acid being 0.5-5 mg/L and the concentration of linolenic acid being 6.5-5 mg/L; and the hormone includes insulin, the concentration of insulin being 5-30 mg/L.

2. The cell sheet protection solution according to claim 1, wherein the pH of the cell sheet protection solution is 7.0-7.4.

3. The cell sheet protection solution according to claim 1, wherein the osmotic pressure of the cell sheet protection solution is 240-340 mOSM/L.

4. The cell sheet protection solution according to claim 1, wherein the cell sheet protection solution is flee of serum.

5. The cell sheet protection solution according to claim 1, which is a stem cell sheet protection solution.

6. The cell sheet protection solution according to claim 5, which is a mesenchymal stem cell sheet protection solution.

7. A method of storing a cell sheet comprising placing a cell sheet in the cell sheet protection solution according to claim 1 and storing the cell sheet.

8. A method of transporting a cell sheet comprising placing a cell sheet in the cell sheet protection solution according to claim 1 and transporting the cell sheet.

* * * * *